Figure 3:
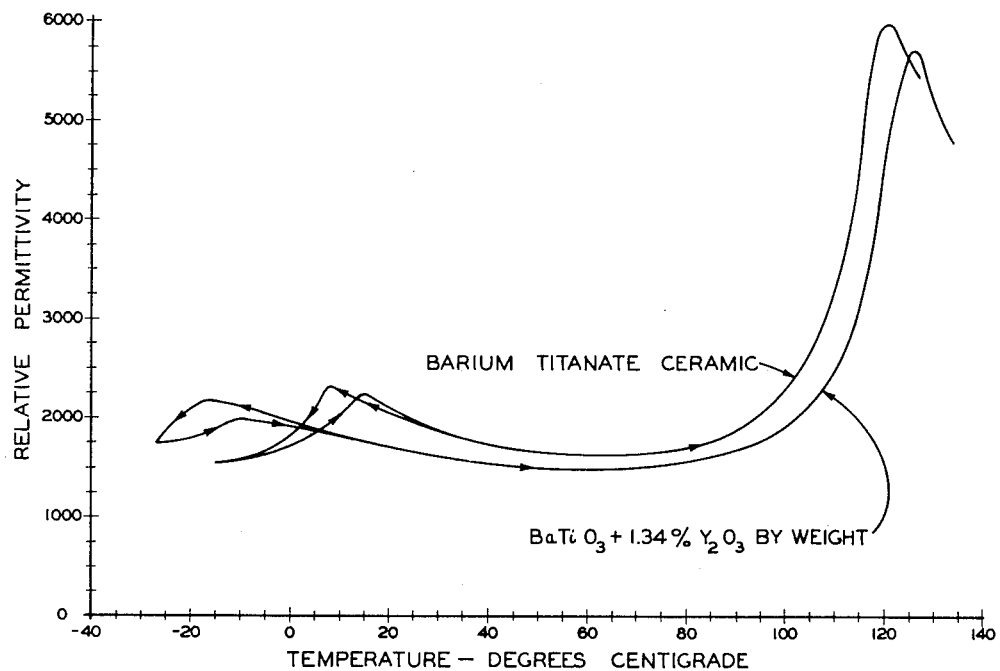

Feb. 14, 1956  F. KULCSAR  2,735,024
FIRED CERAMIC BARIUM TITANATE BODY
Filed Oct. 27, 1951

INVENTOR.
FRANK KULCSAR
BY
ATTORNEY

United States Patent Office 2,735,024
Patented Feb. 14, 1956

2,735,024

FIRED CERAMIC BARIUM TITANATE BODY

Frank Kulcsar, Fairview Park, Ohio, assignor, by mesne assignments, to Clevite Corporation, Cleveland, Ohio, a corporation of Ohio Application October 27, 1951, Serial No. 253,549

11 Claims. (Cl. 310—8.3)

This invention relates to fired ceramic dielectric bodies, and more particularly to such bodies composed of barium titanate in major amount and suitable for electrical and electromechanical applications.

Polycrystalline bodies composed primarily of barium titanate, usually in the form resulting from a ceramic-firing operation, have well known utility as electrical components. Such bodies exhibit values of permittivity extraordinarily high relative to the permittivity of free space, that is, remarkably high values of dielectric constant. The permittivity has a very marked peak at the Curie point, where a crystallographic transformation occurs. The ordinary polycrystalline barium titanate body, containing perhaps one and a half to two percent by weight of glass-forming oxides and oxidic impurities, undergoes this transformation at a temperature of about 120° C. A secondary transformation occurs at a temperature not far below room temperature. This second transition also is accompanied by a peak in permittivity which, while relatively small, nevertheless may reach a value a third again as high as the minimum value found in the temperature range of 50–75° C. As the temperature drops below the second transition point, the permittivity decreases rapidly to values still lower than those found in the 50–75° C. range. A third transition also may be observed at still lower temperatures.

In addition to their remarkable permittivity characteristics, barium titanate ceramic bodies exhibit, upon being subjected to an electrostatic polarizing field, linear electromechanical responses of considerable magnitude. Transducers utilizing these electromechanical properties are disclosed and claimed in the patent to Robert B. Gray No. 2,486,560, which deals specifically with prepolarized bodies having a linear response by virtue of a remanent electrostatic polarization, and in application for letters patent Ser. No. 740,460, filed April 9, 1947, in the name of Hans Jaffe and assigned to the same assignee as the present invention. The latter application deals primarily with electromechanical transducers comprising barium titanate bodies across which a unidirectional polarizing field is maintained during operation, and discloses and claims additionally transducers including such bodies in acoustical contact with a liquid medium.

The electromechanical responses of a polarized polycrystalline barium titanate body vary in magnitude somewhat with temperature. However, the variations in capacitance over the frequently encountered temperature range of 5–50° C. may prove more objectionable in the operation of transducers. The fixed capacitance of the vacuum tube circuits and connecting wiring generally used with such transducers frequently is sufficiently small that the changes in capacitance of the transducer body itself with temperature amount to a large fraction of the average capacitance over the temperature range. As a result sensitivity changes of one decibel or more may be encountered. Another effect which may be of considerable importance with barium titanate transducers stems from the fact that Young's modulus passes through a minimum value at the second transition temperature, so that the mechanical compliance has a maximum value at that temperature. This effect can be rather critical when the transducer is designed to operate at a frequency of mechanical resonance of the titanate body, since the resonant frequency reaches a pronounced minimum at the second transition temperature. Thus it will be seen that the temperature variations of the mechanical compliance and of the permittivity in the region of the second transition temperature may be substantial drawbacks to the use of the conventional barium titanate ceramics in certain types of electromechanical transducer equipments.

Numerous additions to barium titanate ceramic bodies have been investigated in attempts to secure useful modifications of the dielectric and electromechanical characteristics. Some additions have the effect of shifting or of minimizing the rather drastic changes which occur with changes of temperature. For example, the addition of several percent by weight of zorconia, $ZrO_2$, causes a pronounced raising of the second transition point and a smaller lowering of the Curie point. Polycrystalline ceramic materials of this type are disclosed and claimed in U. S. Letters Patent No. 2,708,243 issued on May 10, 1955, to Edwin J. Brajer and assigned to the same assignee as the present invention. Stannic oxide and barium stannate additions have somewhat similar effects, except that the downward shift of the Curie point is more pronounced than the upward shift of the second transition point. The addition of lead titanate, on the other hand, lowers the second transition point while raising the Curie point almost as much. The volatile nature of the lead additions, however, adds difficulties to their use. An addition of four percent by weight of lead titanate lowers the second transition point by about 20° C., and greater additions have not been found desirable.

Another type of addition, exemplified by certain magnesium salts, has been found useful in the capacitor industry because the capacitance-temperature characteristic is flattened over large temperature ranges. However, these additions tend to produce a pronounced lowering of the linear electromechanical response coefficients.

Another type of addition to barium titanate ceramic materials, chemically unrelated to the types of additions mentioned hereinabove, now has been discovered. Additions of this type permit the use of ceramic bodies in capacitors and in electromechanical transducers which require decreased temperature dependence of capacitance and of compliance. Such additions make operation possible under varied ambient temperature conditions without approaching undesirably close to any transition points, even when operating conditions involve a temperature range from a temperature substantially below room temperature, or even lower, to a temperature of 90° C., or even higher, depending on the amount of the addition.

Accordingly, it is an object of this invention to provide a new and improved fired ceramic body which avoids one or more of the disadvantages of the bodies known to the prior art.

It is another object of this invention to provide a new and improved fired ceramic dielectric body having a permittivity-temperature characteristic free of excessive variations over the range of temperatures usually encountered with electrical and electronic apparatus.

It is a further object of this invention to provide a new and improved fired ceramic body which exhibits useful linear electromechanical responses over an extended temperature range below and above ordinary room temperature.

It is still another object of this invention to provide a new and improved dielectric body, obtained conveniently by conventional ceramic-firing operations performed on the material in polycrystalline form, and having electrical operating characteristics of relatively high stability and large magnitudes at normal ambient temperatures.

It is a still further object of the invention to provide a new and improved fired ceramic body containing barium titanate in major amount and having relatively unvarying values of mechanical compliance and resonant frequency constant over an extended temperature range below room temperatures.

In accordance with the invention, a fired ceramic dielectric body comprises barium titanate in major amount and a substantial amount of a compound of yttrium. In accordance with a more specific feature of the invention, a capacitor comprises a fired ceramic body composed of barium titanate and a compound of yttrium in the amounts just mentioned, and also comprises a pair of electrodes individually adjacent to two opposed surfaces of the body. In accordance with another more specific feature of the invention, an electromechanical device for transducing between electrical energy and mechanical energy comprises a fired ceramic dielectric body composed as aforesaid of barium titanate and a compound of yttrium. This electromechanical device further comprises a pair of electrodes for translating the electrical energy and means for translating the mechanical energy transduced in the body.

For a better understanding of the present invention, together with other and further objects thereof, reference is had to the following description taken in connection with the accompanying drawing, and its scope will be pointed out in the appended claims.

Figures 1, 2:
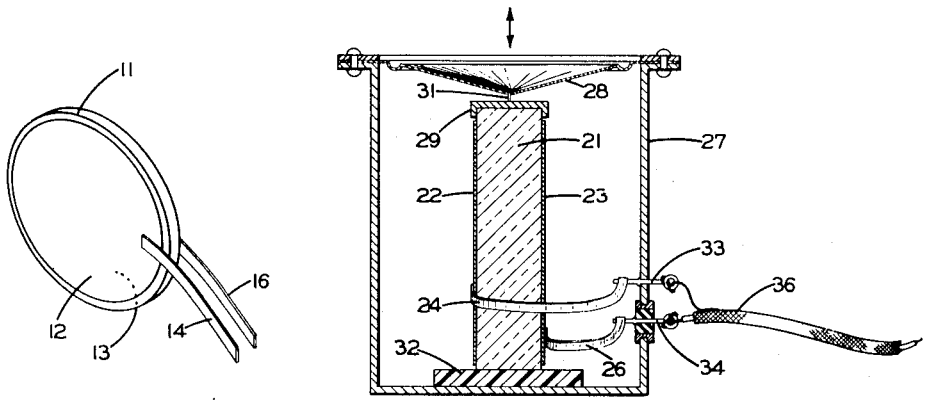

In the drawing, Fig. 1 is a perspective view of a fired ceramic dielectric body in accordance with the invention, shown in the form of a capacitor having a pair of electrodes;

Fig. 2 is a sectional view of an electromechanical transducing device, specifically a microphone, embodying one feature of the present invention; and Fig. 3 includes a group of curves representing the temperature-permittivity characteristics of certain ceramic dielectric bodies comprising barium titanate in major amount.

Referring now to Fig. 1, there is illustrated in perspective a fired ceramic dielectric body 11 in the shape of a thin disk. The body 11 comprises, in accordance with the invention, barium titanate in major amount and a substantial amount of a compound of yttrium. The green ceramic body may be prepared in a manner conventional with barium titanate electrical ceramics, the desired amount of a compound of yttrium in powdered form being mixed in, and the body then fired using conventional techniques. A typical firing cycle involves holding a maximum temperature of 1375° to 1400° C. for half an hour to one hour.

While it might be difficult, with reference to the fired body, to determine the exact chemical formula of the oxide or salt compound therein which contains the yttrium or the exact crystallographic nature of the yttrium material, the material added conveniently is a purified yttrium material including upwards of ninety percent yttria, $Y_2O_3$, and for convenience it may be assumed that the oxidic yttrium is present in the fired body as the oxide itself. It will be understood, however, that some or all of the yttrium could be added in the form of another compound, such as the silicate, and that some or all of the yttrium in the fired body might be in the form, for example, of a titanate or silicate. In general the trioxide, yttria, is basic in chemical character, so that it is quite possible, especially when an yttrium compound is present in an amount equivalent to an amount of yttrium trioxide greater than a fraction of one percent by weight, that the oxidized yttrium is combined at least in part with acidic oxides which may be present. Presumably the yttrium at times may displace barium from some of the barium titanate or form some kind of an oxidic compound with excess titania which may be present.

It is preferable to incorporate the yttrium in the polycrystalline body as an oxygen-containing compound of yttrium, and more specifically as a compound having yttrium oxide as a major constituent. Thus yttria has the oxide as the major and only constituent, while salts formed by reaction of yttria and another oxide also have yttrium oxide as a major constituent. For the purposes of the present specification and claims, any compound whose formula can be broken down into a mixture of oxides including yttria will be taken as a compound having yttrium oxide as a major constituent.

The desirable properties of such a ceramic dielectric body are not realized by virtue of the type of changes in the crystalline structure which may be accomplished, for example, by the removal of very small amounts of oxygen from a body of titanium dioxide or of barium titanate. Such a removal may cause changes of a type resulting in profound variations in physical characteristics as exemplified by the conductivity, and bodies of these materials may be called crystallographically structure-sensitive to the relative amount of oxygen present. While the theoretical basis of the effects of addition of an yttrium compound to barium titanate is not a part of the present invention, nor is the exact chemical or crystallographic form of the yttrium in the fired body a necessary part of the invention, it seems to be possible that some molecules of the added yttrium are substituted for other molecules in the usual barium titanate crystalline structure. Perhaps a better explanation in many cases would be that the resulting polycrystalline bodies are made up of many small crystallites each of which contains some yttrium or yttria, $Y_2O_3$, effectively in solid solution in the barium titanate. Assuming that some such substitution or solid solution phenomenon actually occurs, without limiting the invention thereto, it may be pointed out that such a phenomenon is not ordinarily associated with structure-sensitive changes. In any case, whatever the mechanism of the yttrium addition may be, it can be stated that the presence of very minute proportions of yttrium would have no practical utility. Thus, the presence of amounts of yttrium so small that they could be determined only by spectographic analysis or only by precision chemical analysis is not within the purview of the present invention. Substantial amounts, not merely trace amounts, of a compound of yttrium are necessary for practical utility.

The exact electrical characteristics of a body of titanate-type ceramic dielectric material are determined to some extent by the quantities and nature of the impurities and of any fluxing or glass-forming compounds which may be present in or added to the material. The grain structure and size, and the exact conditions of the ceramic-firing operation, also may affect the properties within a small range of variation, and slight variations might even be caused by apparently insignificant incidents in the thermal, mechanical, and electrical history of the fired body. As a result, a reasonable range of variation of the electrical properties is to be expected from body to body and from batch to batch. Substantial, but quite small, additions of a compound of yttrium produce changes in the electrical properties which are noticeable and useful when the composition and firing conditions are controlled closely to minimize the more or less random variations attributable to the aforementioned causes. However, for such an addition to produce sizable changes on a statistical basis without very careful controls, the body must comprise an amount of yttrium equivalent to at least about one quarter of one percent by weight of yttrium trioxide.

The body 11 is shown in Fig. 1 as part of a capacitor which comprises a fired ceramic body composed of barium titanate and a compound of yttrium in the proportions discussed hereinabove. The capacitor comprises in addition a pair of electrodes 12 and 13 individually adjacent to two opposed surfaces of the body, in this case the major surfaces of the disk 11. The electrode 13 is on the back surface of the disk as viewed in Fig. 1 and so is hidden from view, but it is similar in shape to electrode 12. Lead strips or wires 14 and 16 are affixed to the electrodes 12 and 13 respectively.

The electrodes should be affixed to the surfaces of the body 11 so as to adhere closely thereto. Since the relative permittivity of the material of the body is very high, even minute air spaces between the body and a portion of the electrode may have the practical effect of destroying the coupling between that portion of the electrode and the body. A finely comminuted carbonaceous powder containing a cementing material makes a good electrode. If a metallic foil is used, it is desirable to affix it to the ceramic body with a conductive cement.

The bodies made in accordance with the present invention from materials commercially available at the present time ordinarily contain a number of other elements, some of which are simply impurities and others of which are useful in determining the behavior during the ceramic-firing operation. Some of these additional elements, with a rough indication of the percentages by weight commonly encountered, are listed hereinbelow, it being assumed that the elements are present as the oxides:

| | |
|---|---|
| $Al_2O_3$ | 0.4–0.9 |
| $SiO_2$ | 0.2–0.4 |
| $SrO$ | 0.3–0.7 |
| $ZrO_2$ | 0.05–0.2 |
| $Na_2O$ | 0.05–0.25 |
| $MgO$ | 0.05–0.1 |
| $CaO$ | 0.1–0.15 |
| $Fe_2O_3$ | 0.02–0.04 |
| $P_2O_5$ | 0.02–0.1 |

It will be understood that in most cases the amounts of the various elements present in the bodies will be intermediate the two amounts given for each of the elements in the above list. In the usual case the total weight percentage of these substances, computed as the oxides, is between about 1.5 and 2.5 percent. Of course, many of these elements actually may be present as salts.

A certain group of oxides is desirable for good ceramic-firing characteristics. For example, the oxides of sodium, aluminum, and silicon, presumably present in the form of sodium and aluminum silicates, are advantageous for this purpose. If materials of this type are not present, undesirably high firing temperatures may have to be resorted to. For this reason a composition containing as little as one percent total oxides of the group listed hereinabove rarely would be used. On the other hand, modification of the ceramic-firing properties and the electrical characteristics may be expected if excessive amounts of materials other than barium, titanium, and yttrium in oxidic form are present. While the amounts of other materials may exceed the amounts listed, and while other impurities also might be present in quite small amounts, it ordinarily would be quite undesirable to have as much as four percent by weight of other compounds.

To obtain the modifications of the electrical and electromechanical properties discussed hereinabove, it is not necessary to include large quantities of a compound of yttrium in the ceramic composition. Regardless of the form which the compound of yttrium may take, it seldom is advantageous to use more than four percent by weight of such compound. Thus, it seldom proves advantageous to employ compositions including oxidic yttrium—that is, yttrium in the form of an oxide or trivalent yttrium in a compound containing oxygen—and including other oxidic materials except barium titanate in a total amount greater than eight percent by weight. Accordingly, the fired ceramic dielectric body of the present invention preferably comprises at least ninety two percent by weight of barium titanate and a substantial amount of a compound of yttrium. More specifically, the body preferably contains an amount of yttrium equivalent to between about one quarter of one percent and about three percent by weight of yttrium trioxide. It is noted that a body comprising three percent by weight of yttria and one percent by weight of excess titania, $TiO_2$, contains very closely equimolar quantities of yttria and titania.

The relationship between electrostatic field strength and electric charge density has been studied for yttria-containing ceramic bodies, using cathode ray oscilloscope measuring techniques. The oscilloscope indications obtained in this way show very pronounced hysteresis loops. This indicates a higher coercive force for electrostatically polarized barium titanate bodies containing yttria than for similar bodies without the yttria. A rather close relationship between dielectric hysteresis and the linear electromechanical responses which are obtained with the titanate-type bodies in the prepolarized state has become apparent as a result of the research work done on titanate bodies during the past few years. This gives an insight into the satisfactory levels of electromechanical response obtainable with the ceramic bodies of the present invention.

In this connection it is helpful to consider the electromechanical response coefficients which are not directly affected by the permittivity of the material of the body. The applicable conventional electromechanical response coefficient ordinarily is represented by the symbol $g$, and has the dimensions of electric field strength per unit mechanical stress or pressure. The $g_{31}$ coefficient, representing the field strength produced in a thickness direction, which is also the direction of polarization, by a mechanical stress applied in a length direction, for the bodies under consideration is in the approximate range of 4 to $5 \times 10^{-3}$ volt-meter per newton.

Referring now to Fig. 2, there is shown in central sectional view an electromechanical device for transducing between electrical energy and mechanical energy which embodies the present invention. The transducer comprises a fired ceramic body 21 composed of barium titanate in major amount and a substantial amount of a compound of yttrium, preferably at least about one quarter of one percent by weight of yttrium computed as the trioxide. It will be understood that electrostatically polarized bodies having the satisfactorily high values of the $g$ coefficient referred to above will develop a usefully high linear mechanical strain response when an electrical charge is produced thereon. However, for convenience of discussion, the device illustrated in Fig. 2 may be taken to be a microphone arranged to develop usefully high electric responses to the application of mechanical signal stresses. In particular, the microphone of Fig. 2 is useful over a wide frequency band including sonic and ultrasonic frequencies. If the body 21 has a length, or vertical dimension as viewed in Fig. 2, of about one inch, a width of about a half inch, and a thickness of about a quarter inch as seen in the sectional view of Fig. 2, a broad band response up to a frequency in the neighborhood of 100 kc. p. s. may be obtained. If resonant operation is desirable, a high resonant response may be had at about the frequency just mentioned for the dimensions given.

The body 21 is provided with a pair of electrodes 22 and 23 individually adjacent to the two opposed major surfaces of the body for translating the electrical energy associated with the transducing. Lead conductors 24 and 26 are affixed to the respective electrodes.

The electroded body 21 is enclosed in a deep-drawn metallic container 27 formed with a protruding flange around the open end thereof. A means is provided for translating the mechanical energy transduced in the body during operation as a microphone. This means includes a shallow conical diaphragm 28, securely affixed to the container 27 around the flanged rim thereof and coupled to the external acoustic medium, ordinarily the atmosphere. The upper end of the body 21 carries a yoke 29 securely affixed thereto, and the yoke 29 is connected to the apex of the conical diaphragm 28 by a drive pin 31. The other end of the body 21 is cemented to a base member 32, which may be a strip of stiff insulating material such as a vinyl resin. The other surface of the strip 32 is cemented to the inner end of the container 27.

The lead conductor 24 conveniently may be kept at ground potential and passed through a wall of the container 27 by means of a conducting pin 33. The other lead conductor 26 is connected to the central conductor 34 of an insulated feed-through bushing in the container wall. The pin 33 and conductor 34 are connected to the shield and to the central conductor respectively of a shielded cable 36 for carrying the electric signals developed during operation of the microphone.

The body 21, as mentioned hereinabove, is polarized by the application of a strong unidirectional electrostatic field thereto to condition the body to develop the linear electromechanical responses. This conditioning is desirable whether the device is to be used as a microphone or as a telephone receiver or loud speaker. In the absence of such conditioning, the device may develop substantial mechanical responses to applied electrical fields, but these responses will follow a square-law relationship to the applied field and the reverse electrical effect will not occur at all upon application of mechanical energy to the body. The polarizing field may be continuously maintained by connecting a source of a high unidirectional potential across the conductors of the cable 36 with a suitable blocking capacitor to isolate the amplifying or other equipment (not shown) utilizing the electrical signals derived across the electrodes 22 and 23. Preferably, however, the linear electromechanical response of the body 21 is obtained by prepolarization, that is, conditioning the body to exhibit a substantial remanent electrostatic polarization produced by the application thereto of a unidirectional field. In either case it is preferable that the value of the polarizing field be high relative to the amplitudes of the electrical signals to be encountered during transducing. Ordinarily the polarizing field strength approaches the electrical breakdown field strength for the ceramic body.

During operation of the device of Fig. 2, acoustic waves in the atmosphere impinge on the external surface of the diaphragm 28, causing vertical motion of the drive pin 31, alternately compressing and expanding the body 21 in a lengthwise direction. As a result of this translation of mechanical force through the drive pin to the yoke 29, the mechanical energy is transduced within the body 21 to produce electric signal fields across the electrodes 22 and 23 and corresponding electric charges on these electrodes. These electric signals pass through the leads and the cable 36 to excite any amplifying, indicating, or reproducing equipment which may be coupled thereto.

Referring to Fig. 3, there is illustrated in graph form the relationship between the temperature of a ceramic body and the relative permittivity of the material of the body. The upper graph illustrates the behavior of the conventional barium titanate ceramic. As mentioned hereinabove, as the ordinary barium titanate ceramic body is heated from room temperature, the permittivity decreases rather quickly and then more slowly to reach a minimum value at about 60° C., and then above about 75° C. commences to increase more and more rapidly to a very high peak at the Curie point of about 120° C. As the temperature is decreased from room temperature, another well defined but lower peak occurs just below 10° C., and further decrease in temperature causes a very sharp drop in permittivity. Raising the temperature again to room temperature, it is found that the peak value of permittivity is somewhat lower and occurs at a temperature some 7° higher than is the case for descending temperatures.

The lower curve gives corresponding information for a ceramic body similar in composition but containing in addition about 1.34 percent $Y_2O_3$ by weight. The behavior upon increasing the temperature from room temperature is quite similar, except that the Curie point is shifted upward five or six degrees. Upon decreasing the temperature, however, the peak value of permittivity at the second transition point is somewhat less sharply defined and occurs at a much lower temperature, in this case about −17° C. The same phenomena occur upon increasing the temperature again to room temperature as occur with the conventional barium titanate, except that again the peak is much less sharp.

It is noted that this yttria-containing ceramic may be used to −10° C. or lower without incurring the changes involved in the second transformation. Moreover, while with ordinary barium titanate the permittivity at 15° is 31% higher than at 60°, with the composition containing 1.34 weight percent of yttria the permittivity at 15° is only 18% higher than at 60°. As a rule of thumb, the second transition point is lowered at the rate of about 20° C. per each percent addition of yttria by weight. The permittivities at corresponding points relative to the transition temperatures are generally lower with the compositions containing yttrium.

When the amount of yttria added is about two and one half percent by weight or more, it is desirable to provide in the composition enough titania, in excess of that combined as barium titanate, to balance the yttria. This is particularly desirable when the fired ceramic dielectric body is to be incorporated in an electromechanical device. Thus, such a device, in accordance with a preferred embodiment of the invention, comprises a body composed of at least ninety two percent by weight of barium titanate, at least about two and one half percent by weight of yttrium computed as the trioxide, additional titanium computed as the dioxide in approximately equimolar amounts relative to the aforementioned yttrium trioxide, and less than four percent by weight of other compounds. The second transition point of such a body occurs at a temperature well below −35° C., while the Curie point is at about 129° C. or higher. It is not necessary for this purpose to provide sufficient excess titania to satisfy the formula for yttrium metatitanate.

However, if no excess titania is provided, the g coefficient has been found to drop below $2 \times 10^{-3}$ voltmeter per newton. When the excess titania is not provided, the permittivity is considerably higher, the permittivity-temperature characteristic is flatter, and only a slight increase occurs at temperatures in the vicinity of the temperature of the second transition point as observed with the balanced material. The relative permittivity at room temperature was just under 1,000 for a sample containing about 2.68 weight percent of yttria balanced with an equimolar weight of titania, while the corresponding value for such a composition without the excess titania was over 2,400. In the latter case the peak at the Curie point also is very much flattened. Thus the unbalanced compositions containing the relatively high proportions of yttria may be useful in applications where a high, relatively unvarying capacitance is desired but where high electromechanical responses are not important. Conversely, it has been observed that the reverse effect tends to occur if a body containing considerably less than two and one half percent yttria is supplied with equimolar amounts of titania. Thus, such an addition to the body containing about 1.34% $Y_2O_3$ by weight, which was the body used in obtaining the lower curve in Fig. 3, caused the g coefficient to be decreased to less than sixty percent of the value obtainable without the excess titania, with no useful changes in the permittivity-temperature characteristic.

In summary, it may be noted that the dielectric constant remains higher with yttria additions than with, for example, lead titanate additions giving the same shift of the second transition point, and that the yttria is about twice as effective per mole in lowering the second transition point. The yttria-containing bodies are easily handled in ceramic-firing operations, which is not the case with bodies containing lead titanate. The fired ceramic bodies of the present invention provide useful characteristics not found with the ordinary barium titanate bodies of the prior art.

While there have been described what at present are considered to be the preferred embodiments of this invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. A fired ceramic dielectric body consisting essentially of at least ninety two percent by weight of barium titanate and an amount of yttrium equivalent to between about one quarter of one percent and about three percent by weight of yttrium trioxide.

2. A fired ceramic dielectric body consisting essentially of at least about ninety two percent by weight of barium titanate and in addition a compound of yttrium selected from the group consisting of yttrium titanate and yttrium silicate in an amount between about .25 of 1 percent and about 3 percent by weight of yttrium trioxide.

3. A fired ceramic dielectric body consisting essentially of at least about ninety two percent by weight of barium titanate and in addition an oxygen-containing compound of yttrium in an amount between about .25 of 1 percent and about 3 percent by weight of yttrium trioxide.

4. A fired ceramic dielectric body consisting essentially of at least about ninety two percent by weight of barium titanate and in addition a compound of yttrium which has yttrium oxide as a major constituent, said body having between about .25 of 1 percent and about 3 percent by weight of yttrium trioxide.

5. A fired ceramic dielectric body consisting essentially of at least about ninety two percent by weight of barium titanate and an amount of yttrium equivalent to at least about one quarter of one percent and not greater than about 3 percent by weight of yttrium trioxide.

6. A capacitor comprising: a fired ceramic body composed of at least about ninety two percent by weight of barium titanate and in addition a compound of yttrium in greater than about .25 of 1 percent and less than about 3 percent by weight of yttrium trioxide, and a pair of electrodes individually adjacent to two opposed surfaces of said body.

7. An electromechanical device for transducing between electrical energy and mechanical energy, comprising: a fired ceramic dielectric body composed of at least about ninety two percent by weight of barium titanate and in addition a compound of yttrium in an amount between about .25 of 1 percent and 3 percent yttrium trioxide, a pair of electrodes individually adjacent to two opposed surfaces of said body for translating said electrical energy, and means for translating said mechanical energy transduced in said body.

8. An electromechanical device for transducing between electrical energy and mechanical energy, comprising: a fired ceramic dielectric body composed of at least about ninety two percent by weight of barium titanate and an amount of yttrium equivalent to at least about one quarter of one percent by weight and not exceeding about 3 percent by weight of yttrium trioxide, a pair of electrodes individually adjacent to two opposed surfaces of said body for translating said electrical energy, and means for translating said mechanical energy transduced in said body.

9. An electromechanical device for transducing between electrical energy and mechanical energy, comprising: a fired ceramic dielectric body composed of at least ninety two percent by weight of barium titanate, an amount of yttrium equivalent to at least about two and one half percent by weight of yttrium trioxide, and amount of additional titanium equivalent to titanium dioxide in approximately equimolar amount relative to said yttrium trioxide, and less than four percent by weight of other compounds; a pair of electrodes individually adjacent to two opposed surfaces of said body for translating said electrical energy; and means for translating said mechanical energy transduced in said body.

10. An electromechanical device for transducing between electrical energy and mechanical energy, comprising: a fired ceramic dielectric body, composed of at least about ninety two percent by weight of barium titanate and in addition a compound of yttrium in an amount greater than about .25 to 1 percent and less than about 3 percent yttrium trioxide, and polarized by the application of a strong unidirectional field thereto; a pair of electrodes individually adjacent to two opposed surfaces of said body for translating said electrical energy; and means for translating said mechanical energy transduced in said body.

11. An electromechanical device for transducing between electrical energy and mechanical energy, comprising: a fired ceramic dielectric body, composed of at least about ninety two percent by weight of barium titanate and in addition a compound of yttrium in an amount greater than about .25 of 1 percent and less than about 3 percent yttrium trioxide, and exhibiting a substantial remanent electrostatic polarization produced by the application thereto of a unidirectional field; a pair of electrodes individually adjacent to two opposed surfaces of said body for translating said electrical energy; and means for translating said mechanical energy transduced in said body.

References Cited in the file of this patent

UNITED STATES PATENTS

| | | |
|---|---|---|
| 2,432,250 | Rath | Dec. 9, 1947 |
| 2,486,560 | Gray | Nov. 1, 1949 |
| 2,533,140 | Rodriguez | Dec. 5, 1950 |
| 2,540,187 | Cherry | Feb. 6, 1951 |
| 2,592,703 | Jaffe | Apr. 15, 1952 |